（12）United States Patent
Larlus-Larrondo et al.

(10) Patent No.: US 8,873,812 B2
(45) Date of Patent: Oct. 28, 2014

(54) IMAGE SEGMENTATION USING HIERARCHICAL UNSUPERVISED SEGMENTATION AND HIERARCHICAL CLASSIFIERS

(75) Inventors: Diane Larlus-Larrondo, Grenoble (FR); Rui Hu, Guildford (GB); Craig Saunders, Grenoble (FR); Gabriela Csurka, Crolles (FR)

(73) Assignee: Xerox Corporation, Norwalk, CT (US)

( * ) Notice: Subject to any disclaimer, the term of this patent is extended or adjusted under 35 U.S.C. 154(b) by 170 days.

(21) Appl. No.: 13/567,309

(22) Filed: Aug. 6, 2012

(65) Prior Publication Data
US 2014/0037198 A1 Feb. 6, 2014

(51) Int. Cl.
*G06K 9/00* (2006.01)
(52) U.S. Cl.
CPC ....................................... *G06K 9/00* (2013.01)
USPC ........... 382/118; 382/103; 382/173; 382/180; 382/218; 382/224; 382/228
(58) Field of Classification Search
CPC ........... G06T 2207/20016; G06T 9/40; G06K 9/6219; G06K 9/00228; G06K 9/00288; G06K 9/6227; G06K 9/6282; G06K 9/00087; G06K 9/00536; G06K 9/6279; G06K 9/6287; G06K 9/342; G06K 9/6267; G06K 9/00456; G06K 9/6278; G06F 17/30327; G06F 17/30705
USPC .................. 382/103, 159, 173, 180, 224, 228
See application file for complete search history.

(56) References Cited

U.S. PATENT DOCUMENTS

| | | | | |
|---|---|---|---|---|
| 4,944,023 A * | 7/1990 | Imao et al. | ..................... | 382/240 |
| 6,560,359 B2 * | 5/2003 | Yoshii | ............................ | 382/173 |
| 7,162,073 B1 * | 1/2007 | Akgul et al. | .................. | 382/149 |
| 7,286,724 B2 * | 10/2007 | Seol et al. | ..................... | 382/305 |
| 7,440,586 B2 | 10/2008 | Avidan | | |
| 7,697,759 B2 * | 4/2010 | Tilton | ........................... | 382/180 |
| 8,014,590 B2 * | 9/2011 | Lee et al. | ..................... | 382/155 |
| 8,107,726 B2 | 1/2012 | Xu et al. | | |

(Continued)

OTHER PUBLICATIONS

Gonfaus, et al. "Harmony potentials for joint classification and segmentation", CVPR 2010, p. 3280-3287.
Gu, et al. "Recognition using regions", CVPR 2009, p. 1030-1037.
Lim, et al. "Context by region ancestry", ICCV 2009, p. 1978-1985.
Vijayanarasimhan, et al. "Efficient region search for object detection", CVPR 2011, p. 1401-1408.

(Continued)

*Primary Examiner* — Vikkram Bali
*Assistant Examiner* — Aklilu Woldemariam
(74) *Attorney, Agent, or Firm* — Fay Sharpe LLP

(57) ABSTRACT

An image segmentation method includes generating a hierarchy of regions by unsupervised segmentation of an input image. Each region is described with a respective region feature vector representative of the region. Hierarchical structures are identified, each including a parent region and its respective child regions in the hierarchy. Each hierarchical structure is described with a respective hierarchical feature vector that is based on the region feature vectors of the respective parent and child regions. The hierarchical structures are classified according to a set of predefined classes with a hierarchical classifier component that is trained with hierarchical feature vectors of hierarchical structures of training images. The training images have semantic regions labeled according to the set of predefined classes. The input image is segmented into a plurality of semantic regions based on the classification of the hierarchical structures and optionally also on classification of the individual regions.

21 Claims, 7 Drawing Sheets

(56) References Cited

U.S. PATENT DOCUMENTS

| | | | |
|---|---|---|---|
| 8,620,077 B1* | 12/2013 | Grundmann et al. | 382/173 |
| 2002/0057841 A1* | 5/2002 | Yoshii | 382/224 |
| 2003/0021481 A1 | 1/2003 | Kasutani | |
| 2003/0117604 A1* | 6/2003 | Kobayashi et al. | 355/55 |
| 2003/0176931 A1* | 9/2003 | Pednault et al. | 700/31 |
| 2004/0017941 A1* | 1/2004 | Simske | 382/180 |
| 2004/0091153 A1* | 5/2004 | Nakano et al. | 382/228 |
| 2005/0008227 A1* | 1/2005 | Duan et al. | 382/195 |
| 2006/0120617 A1* | 6/2006 | Park | 382/255 |
| 2006/0140455 A1* | 6/2006 | Costache et al. | 382/118 |
| 2007/0005356 A1 | 1/2007 | Perronnin | |
| 2007/0022067 A1 | 1/2007 | Cremers et al. | |
| 2007/0127834 A1* | 6/2007 | Lee et al. | 382/254 |
| 2007/0248282 A1* | 10/2007 | Suzuki | 382/282 |
| 2007/0258648 A1 | 11/2007 | Perronnin | |
| 2008/0069456 A1 | 3/2008 | Perronnin | |
| 2008/0086470 A1* | 4/2008 | Graefe | 707/8 |
| 2008/0240572 A1 | 10/2008 | Hoshii | |
| 2008/0317358 A1 | 12/2008 | Bressan et al. | |
| 2009/0030864 A1* | 1/2009 | Pednault et al. | 706/45 |
| 2009/0144033 A1 | 6/2009 | Liu et al. | |
| 2009/0208118 A1 | 8/2009 | Csurka | |
| 2010/0040285 A1 | 2/2010 | Csurka et al. | |
| 2010/0082615 A1 | 4/2010 | Clinchant et al. | |
| 2010/0092075 A1* | 4/2010 | Lee et al. | 382/159 |
| 2010/0092084 A1 | 4/2010 | Perronnin et al. | |
| 2010/0098343 A1 | 4/2010 | Perronnin et al. | |
| 2010/0189354 A1 | 7/2010 | de Campos et al. | |
| 2010/0191743 A1 | 7/2010 | Perronnin et al. | |
| 2010/0226564 A1 | 9/2010 | Marchesotti et al. | |
| 2010/0281009 A1 | 11/2010 | Wen et al. | |
| 2010/0318477 A1 | 12/2010 | Perronnin et al. | |
| 2010/0322518 A1 | 12/2010 | Prasad et al. | |
| 2010/0322525 A1 | 12/2010 | Kohli et al. | |
| 2011/0026831 A1 | 2/2011 | Perronnin et al. | |
| 2011/0040711 A1 | 2/2011 | Perronnin et al. | |
| 2011/0052063 A1 | 3/2011 | McAuley et al. | |
| 2011/0072012 A1 | 3/2011 | Ah-Pine et al. | |
| 2011/0091105 A1 | 4/2011 | Perronnin | |
| 2011/0137898 A1 | 6/2011 | Gordo et al. | |
| 2011/0184950 A1 | 7/2011 | Skaff et al. | |
| 2012/0045134 A1 | 2/2012 | Perronnin et al. | |
| 2012/0054130 A1 | 3/2012 | Mensink et al. | |
| 2012/0076401 A1 | 3/2012 | Sanchez et al. | |
| 2012/0158739 A1 | 6/2012 | Ah-Pine et al. | |

OTHER PUBLICATIONS

Arbelaez, et al. "Contour detection and hierarchical image segmentation", IEEE Transactions on Pattern Analysis and Machine Intelligence, 33(5), pp. 898-916 (Nov. 2011).

U.S. Appl. No. 13/251,459, filed Oct. 3, 2011, Salamati, et al.

Comaniciu, et al. "Mean Shift: A robust approach toward feature space analysis", IEEE TPAMI, 2002, 24(5): 603-619.

Shi, et al. "Normalized cuts and image segmentation", TPAMI 1997, 22:888-905.

Lafferty, et al. "Conditional random fields: Probabilistic models for segmenting and labeling sequence data" Proc. $18^{th}$ Intl. Conf. on Machine Learning, 2001, pp. 282-289.

Lowe, et al. "Distinctive image features from scale-invariant keypoints", IJCV 2004, vol. 60, p. 91-110.

Perronnin, et al. "Fisher kernels on visual vocabularies for image categorization", CVPR 2007, p. 1-8.

Perronnin, et al. "Improving the fisher kernel for large-scale image classification", Proc. $11^{th}$ ECCV, Part IV, 2010, p. 143-156.

Sanchez, et al. "High-dimensional signature compression for large-scale image classification", CVPR 2011, pp. 1-8.

Hu, et al. "Gradient field descriptor for sketch based retrieval and localization" ICIP 2010, p. 1025-1028.

Csurka, et al. "Generic visual categorization using weak geometry", Toward Category-Level Recognition, p. 207-224 (2006).

Lanchantin, et al. "Unsupervised non-stationary image segmentation using triplet Markov chains", ACIVIS 04, Brussels, Belgium, Sep. 2004, pp. 1-6.

Lempitsky, et al. "A pylon model for semantic segmentation", Proceedings of Advances in Neural Information Processing Systems (NIPS), p. 1485-1493 (Dec. 2011).

Mirzaei, et al. "Optimal estimation of vanishing points in a Manhattan world", IEEE International Conf. on Computer Vision, p. 2454-2461 (Nov. 2011).

Shotton, et al. "Textonboost for image understanding: Multi-class object recognition and segmentation by jointly modeling texture, layout, and context", IJCV 81(1), p. 2-23 (2009).

Farabet, et al. "Scene Parsing with multiscale feature learning, Purity Trees, and Optimal Covers", ICML 2012, (Edinburgh, Jun. 28-Jul. 1, 2012).

Pieczynski, et al. "Statistical image segmentation using triplet markov fields", SPIE's International Symposium on Remote Sensing, pp. 22-27, 2002.

* cited by examiner

IMAGE SEGMENTATION USING HIERARCHICAL UNSUPERVISED SEGMENTATION AND HIERARCHICAL CLASSIFIERS

BACKGROUND

The exemplary embodiment relates to segmentation of images into semantic regions and in particular, to a system and method which generate a hierarchical segmentation of regions and then apply hierarchically trained semantic classifiers for labeling the regions.

For many applications involving the processing of images, or visual documents, one of the processing steps involves the segmentation of the entire image into regions of pixels which are labeled according to semantic class to aid in understanding a scene. For example, in the case of photographic images, this may entail creating pixel-level masks for classes such as "sky," "road," "people," "buildings," etc. The task of simultaneously segmenting the image and classifying (labeling) the different parts of the scene is called semantic segmentation or scene segmentation.

Semantic segmentation has been approached using a variety of methods. Many of these methods employ a classifier which based on region descriptors that aggregate some lower-level information, such as texture or color. See, for example, Gonfaus, et al., "Harmony potentials for joint classification and segmentation," CVPR 2010 ("Gonfaus"); Gu, et al., "Recognition using regions," CVPR 2009; Lim, et al., "Context by region ancestry," ICCV 2009 ("Lim"); and Vijayanarasimhan, et al., "Efficient region search for object detection," CVPR 2011.

In some approaches, an unsupervised segmentation method is first used which partitions the image into several regions. A classification algorithm can then be applied to the regions, described by aggregating low-level features, to determine if this part of the scene is sky, a building, road, and so forth. The region identification step serves to reduce the complexity of the classification method, allowing the classifiers to work at the super-pixel level instead of the pixel level and enforce label consistency between neighboring pixels. These methods are based on the assumption that pixels within a region are more likely to have the same label. Classifiers are often learnt (and then applied at test time) on this "bag-of-regions".

One problem with such methods is that labeling is performed at the region level. In the event that a region groups multiple semantic classes, this often leads to incorrect labeling of the pixels. To overcome this problem, a hierarchy of regions has been proposed instead of a flat structure (single partition of the image into regions). See, for example, Gonfaus; and Lempitsky, et al., "A pylon model for semantic segmentation, NIPS 2011. For these methods, the hierarchical structure is used after the semantic scene recognition, during a post-processing step. This structure is used to enforce the label consistency between regions of the structure, by means of a conditional random field (CRF) model. In the method of Lim, all ancestors of a leaf region are treated as context. This method is based on the assumption that context can improve recognition. A super-pixel labeling problem is considered, and a hierarchy of segmentations, i.e., a region tree, is used. The super-pixels are the leaves of the tree, and the labeling decision for the super-pixels depends on all the ancestral regions i.e., all the parents of the leaf in the tree. A weight vector is learnt for each leaf region that concatenates weights for each parent region. Weights are learnt for each feature of each super-pixel. One problem with this method is that it does not scale well to large training sets as the information for all regions for all training images has to be retained.

INCORPORATION BY REFERENCE

The following references, the disclosures of which are incorporated herein by reference in their entireties, are mentioned:

U.S. Pub. No. 20070022067, published Jan. 25, 2007, entitled STATISTICAL PRIORS FOR COMBINATORIAL OPTIMIZATION: EFFICIENT SOLUTIONS VIA GRAPH CUTS, by Daniel Cremers, et al., discloses a statistical learning method for Bayesian inference in the context of efficient optimization schemes for image restoration.

U.S. Pat. No. 7,440,586, issued Oct. 21, 2008, entitled OBJECT CLASSIFICATION USING IMAGE SEGMENTATION, by Shmuel Avidan, discloses a method in which image pixels with correlated intensities are grouped into a set of segments. Representative pixels are selected and each segment is represented with a set of features. The method searches exhaustively, for a set of selected classifiers, from a set of all available classifiers for the class of objects on single, pairs and triplets of the segments for a combination of segments.

U.S. Pat. No. 8,107,726 issued Jan. 31, 2012, entitled SYSTEM AND METHOD FOR CLASS-SPECIFIC OBJECT SEGMENTATION OF IMAGE DATA by Ning Xu, et al., discloses segmentations at different scales which form a segmentation hierarchy. This hierarchy is converted to a tree-structured conditional random field (CRF) in which the segments form nodes and the edges express the geometrical relation between the components of different scales. The CRF is used as a strong prior for enforcing bottom-up consistency in the final segmentation.

U.S. Pub. No. 20100322518, published Dec. 23, 2010, entitled IMAGE SEGMENTATION BY HIERARCHIAL AGGLOMERATION OF POLYGONS USING ECOLOGICAL STATISTICS, by Lakshman Prasad, et al., discloses a method that yields a multiscale decomposition of an image into constituent features that enjoy a hierarchical relationship with features at finer and coarser scales.

U.S. patent application Ser. No. 13/251,459, filed on Oct. 3, 2011, entitled GRAPH-BASED SEGMENTATION INTEGRATING VISIBLE AND NIR INFORMATION, by Neda Salamati, et al., discloses assigning unary potentials for pixels of the input image that are based on information for a first channel (visible) in the image. For pairs of labels, pairwise potentials are assigned for neighboring pixels of the image. The pairwise potentials are based on information for a second channel in the image (IR), different from the first channel. An objective function is optimized over pixels of the input image to identify labels for pixels of the image from the set of labels by aggregating the unary and pairwise potentials.

U.S. Pub. No. 20110052063, published Mar. 3, 2011, entitled CONSISTENT HIERARCHICAL LABELING OF IMAGE AND IMAGE REGIONS, by Julian McAuley, et al., discloses a method for classification of image regions by recursively partitioning an image into a tree structure in which nodes are defined by the image regions and edges are defined by pairs of nodes connected by edges of the tree. Unary classification potentials are assigned to nodes of the tree and pairwise classification potentials to edges of the tree. The image regions of the tree are labeled based on optimizing an objective function which aggregates the unary classification potentials and the pairwise classification potentials.

U.S. Pub. No. 20100040285, published Feb. 18, 2010, entitled SYSTEM AND METHOD FOR OBJECT CLASS LOCALIZATION AND SEMANTIC CLASS BASED IMAGE SEGMENTATION, by Gabriela Csurka, et al., discloses a method for class-based segmentation of a digital image. Patches of an image are extracted and features are extracted from the patches. For each patch, relevance score are computed for various object classes. These scores are transferred to pixels of the image and an object class is assigned to the pixels, allowing the image to be segmented and the segments labeled, based on object class.

BRIEF DESCRIPTION

In accordance with one aspect of the exemplary embodiment, an image segmentation method includes generating a hierarchy of regions by unsupervised segmentation of an input image. Each hierarchy region is described with a respective region feature vector that is representative of the hierarchy region. Hierarchical structures in the hierarchy are identified. Each of the hierarchical structures includes a parent hierarchy region and its respective child hierarchy regions. Each of the hierarchical structures of the input image hierarchy is described with a respective hierarchical feature vector. The hierarchical feature vector is based on the region feature vectors of the respective parent hierarchy region and child hierarchy regions. With a hierarchical classifier component, each of the input image hierarchical structures is classified according to a set of predefined classes. The hierarchical classifier component has been trained with hierarchical feature vectors of hierarchical structures of training images that include semantic regions labeled according to the set of predefined classes. The input image is segmented into a plurality of semantic regions based on the classification of the hierarchical structures. One or more of the steps of the method may be performed with a processor.

In another aspect of the exemplary embodiment, an image segmentation system includes memory which stores a region detector which identifies regions of an input image by unsupervised segmentation of the image and a hierarchy generator which arranges the identified regions into a hierarchy of regions in the form of a tree structure comprising a plurality of hierarchical structures. Each of hierarchical structures includes a parent region and two child regions. Each parent region is the union of its two respective child regions. A region feature vector extractor describes each of the identified regions with a respective region feature vector. A hierarchical feature vector generator describes each of the plurality of hierarchical structures with a respective hierarchical feature vector which is based on the region feature vectors of the respective parent region and two child regions. Optionally, a region classifier component classifies each of the regions in the hierarchy according to a predefined set of classes, based on the respective region feature vector. A hierarchical classifier component classifies each of the plurality of hierarchical structures according to the predefined set of classes based on the respective hierarchical feature vectors. A labeling component segments the input image into a plurality of semantic regions based on the classification of the hierarchical structures and optionally also the classification of the regions of the hierarchy. A processor in communication with the memory implements the region detector; hierarchy generator, region feature vector extractor, hierarchical feature vector generator, optional region classifier component where present, hierarchical classifier component, and labeling component.

In another aspect, a method for generating an image segmentation system includes receiving a set of training images in which semantic regions of each image have been identified and labeled with a semantic class selected from a predefined set of semantic classes. For each of the training images, the method includes segmenting the training image in an unsupervised manner into a hierarchy of regions, without regard to the labels, extracting a region feature vector for each of the regions in the hierarchy of regions, and generating a hierarchical feature vector for each of a plurality of hierarchical structures in the hierarchy. Each hierarchical structure includes a parent region which is the union of two respective child regions. Each hierarchical feature vector is based on the region feature vectors of exactly three regions, the respective parent region and the two respective child regions. A hierarchical classifier model is trained for at least one of the semantic classes based on the semantic region labels and the hierarchical feature vectors. Optionally, a region classifier model is trained for the at least one of the semantic classes based on the semantic region labels and the region feature vectors. When a new image to be segmented according to semantic class is received, a labeling component is able to label a semantic region of the image according to a class in the set of classes based on hierarchical feature vectors for hierarchical structures comprising regions of a hierarchy that are generated by unsupervised segmentation of the input image.

In another aspect, an image segmentation method includes receiving an image to be segmented and generating a hierarchy of regions of the input image by segmenting the image in an unsupervised manner. The hierarchy of regions is in the form of a binary tree comprising triplets, each triplet comprising a parent region and two child regions. Each region in the hierarchy is described with a region feature vector that describes at least one of the region appearance and the region shape. Each of the triplets is described with a feature vector that aggregates the feature vectors of only the three regions of the triplet. Optionally, a region classifier component is provided that has been trained with region feature vectors of training images that include regions labeled according to semantic class. In this case, regions of the hierarchy are classified, based on the respective region feature vectors, with the region classifier to generate a class score or probability for each of at least one of the semantic classes for each of the regions. A hierarchical classifier component is provided which has been trained with triplet feature vectors of labeled training images. Triplets of the hierarchy are classified, based on the respective triplet feature vectors, with the hierarchical classifier to generate a class score or probability for each of at least one of the semantic classes for each of the triplets. Pixels of the input image are associated with a score or a probability for each semantic class that is computed using the scores or probabilities of the triplets, and optionally of the hierarchy regions, that contain that pixel. The input image is segmented into semantic regions based on the pixel scores or probabilities for the semantic classes.

DETAILED DESCRIPTION

A system and method for semantic image segmentation are disclosed that combine a description of the image in a hierarchy of regions and suitable learning mechanisms to improve the results of segmentation. More specifically, representations of hierarchical structures (e.g., triplets, each consisting of a parent region and its two children) are provided to a classifier to learn a model of each semantic class. The exemplary method combines two different classifiers, one that is trained using a set of regions, where each region is described independently, and one that is trained using a set of triplets, where each triplet is described by a fixed length vector that encodes the representations (feature vectors) of the parent region and of its child regions. In the final semantic segmentation, each pixel of the image can be labeled with a single one of the semantic classes, based on the triplet classification and optionally region classification of the triplet and region where the pixel resides.

Figure 1:
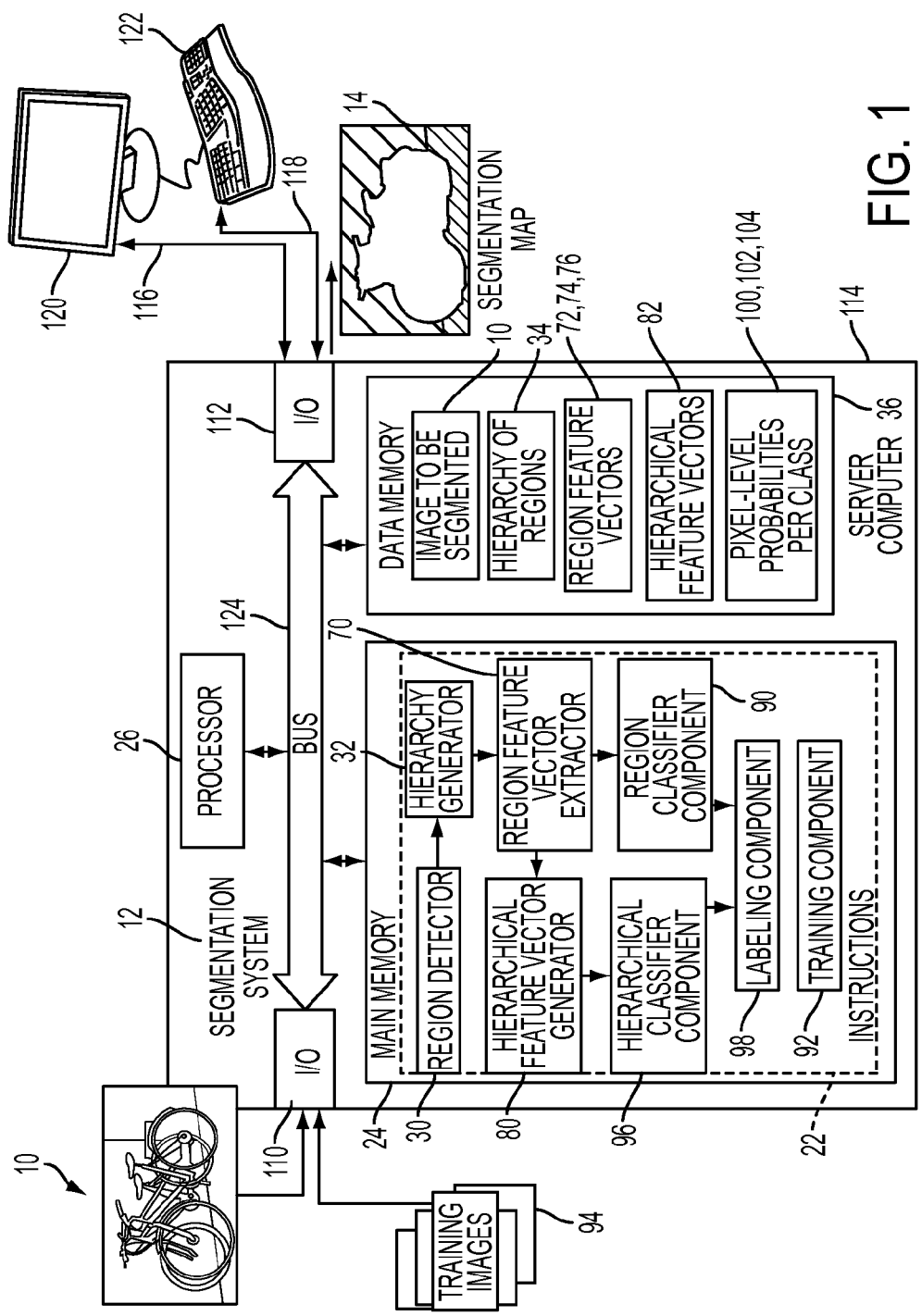
FIG. 1 is a functional block diagram illustrating an image segmentation system in accordance with one aspect of the exemplary embodiment.
Figure 2:
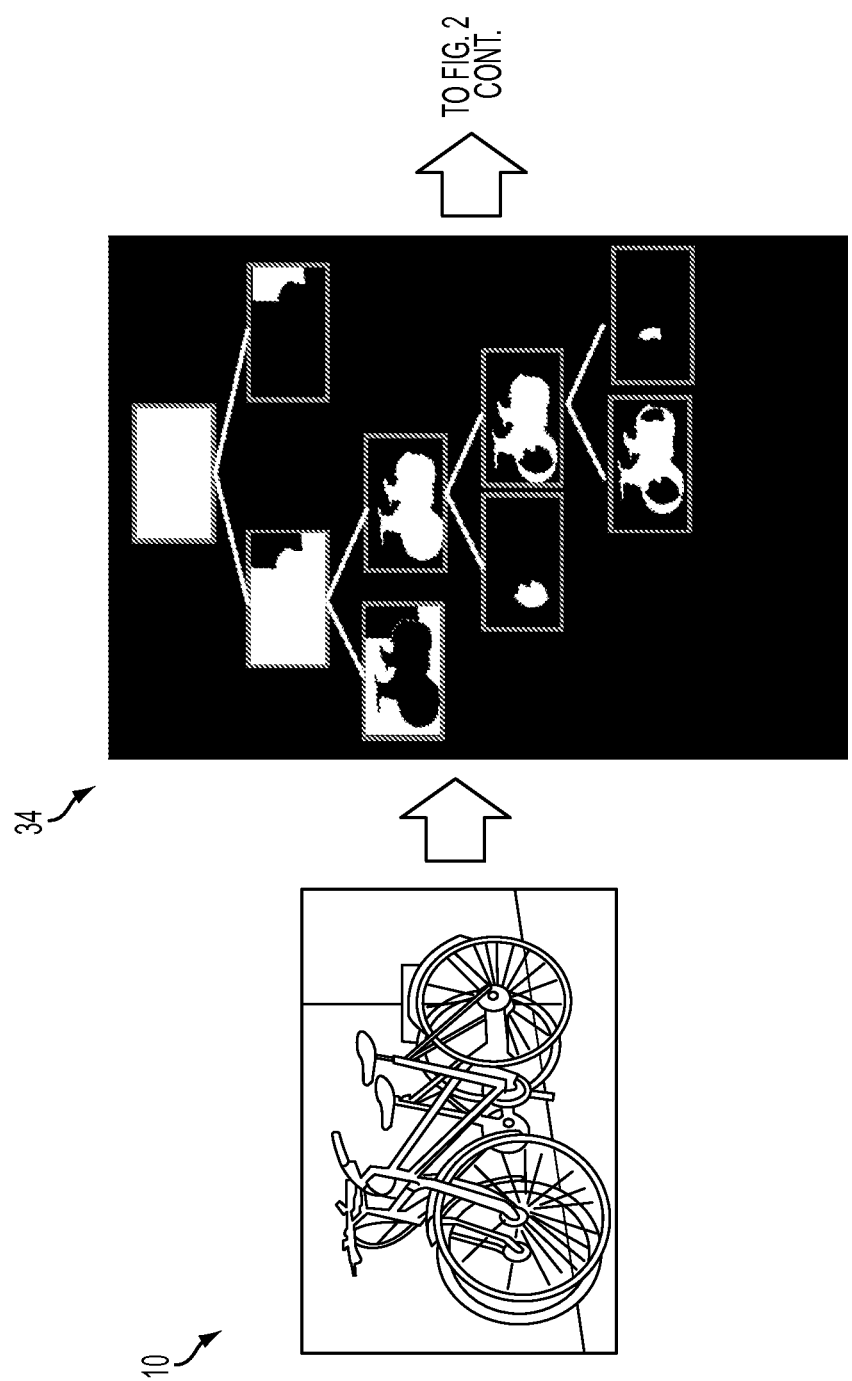
FIG. 2 graphically illustrates aspects of a method for image segmentation in accordance with another aspect of the exemplary embodiment.
Figure 2:
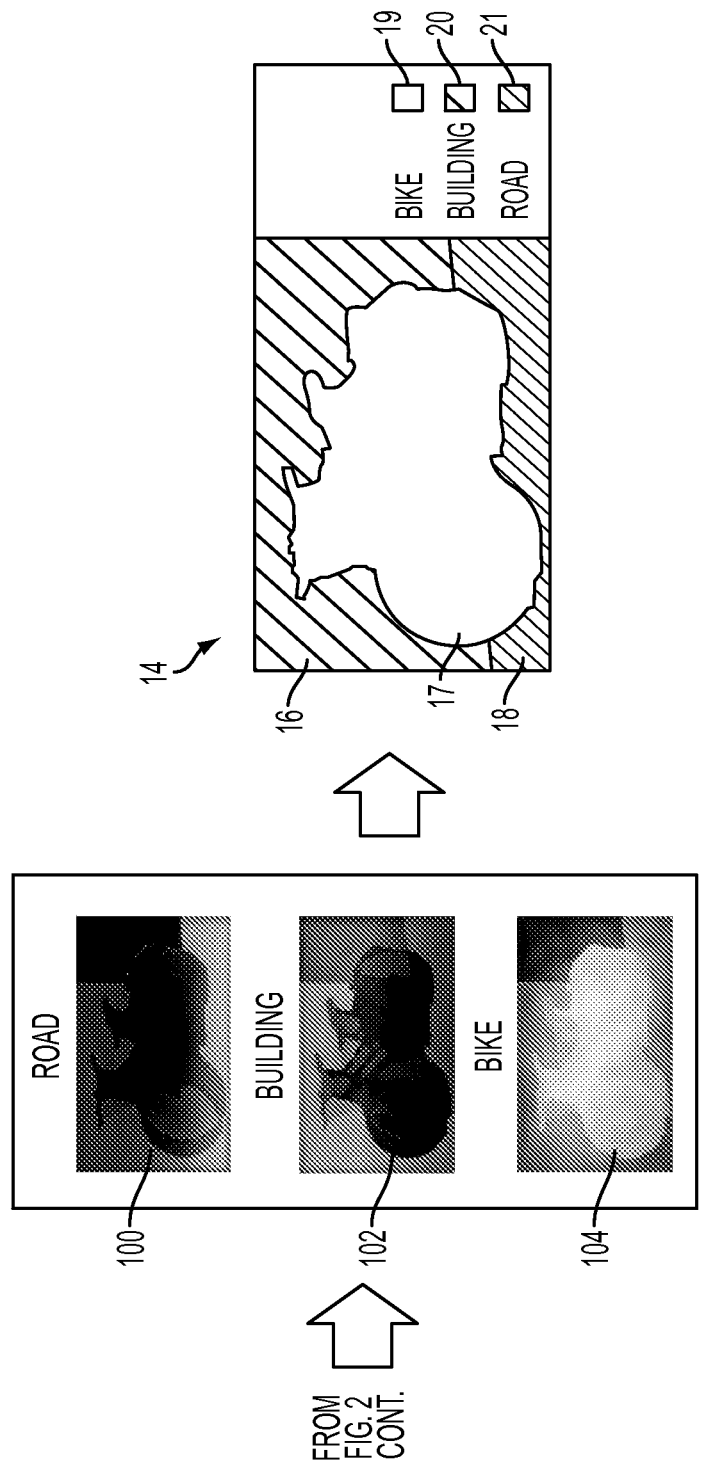

With reference to FIG. 1, an image 10 to be segmented is received by a computer-implemented segmentation system 12, which segments the input image (or test image) 10 to generate a segmentation map 14 of the image in which each of a plurality of non-overlapping semantic regions 16, 17, 18, etc. is labeled with a respective class label 19, 20, 21 selected from a predefined set of semantic class labels as being a probable label for that region. There may be two or more semantic class labels in the predefined set. For example, in the illustrated embodiment shown in FIG. 2, building, bike and road semantic regions are labeled. While most images 10 to be segmented are partitioned into at least two semantic regions 16, 17, 18, it is to be appreciated that in a limited number of cases, the entire image may be labeled with the same class and thus have only one semantic region.

Figure 3:
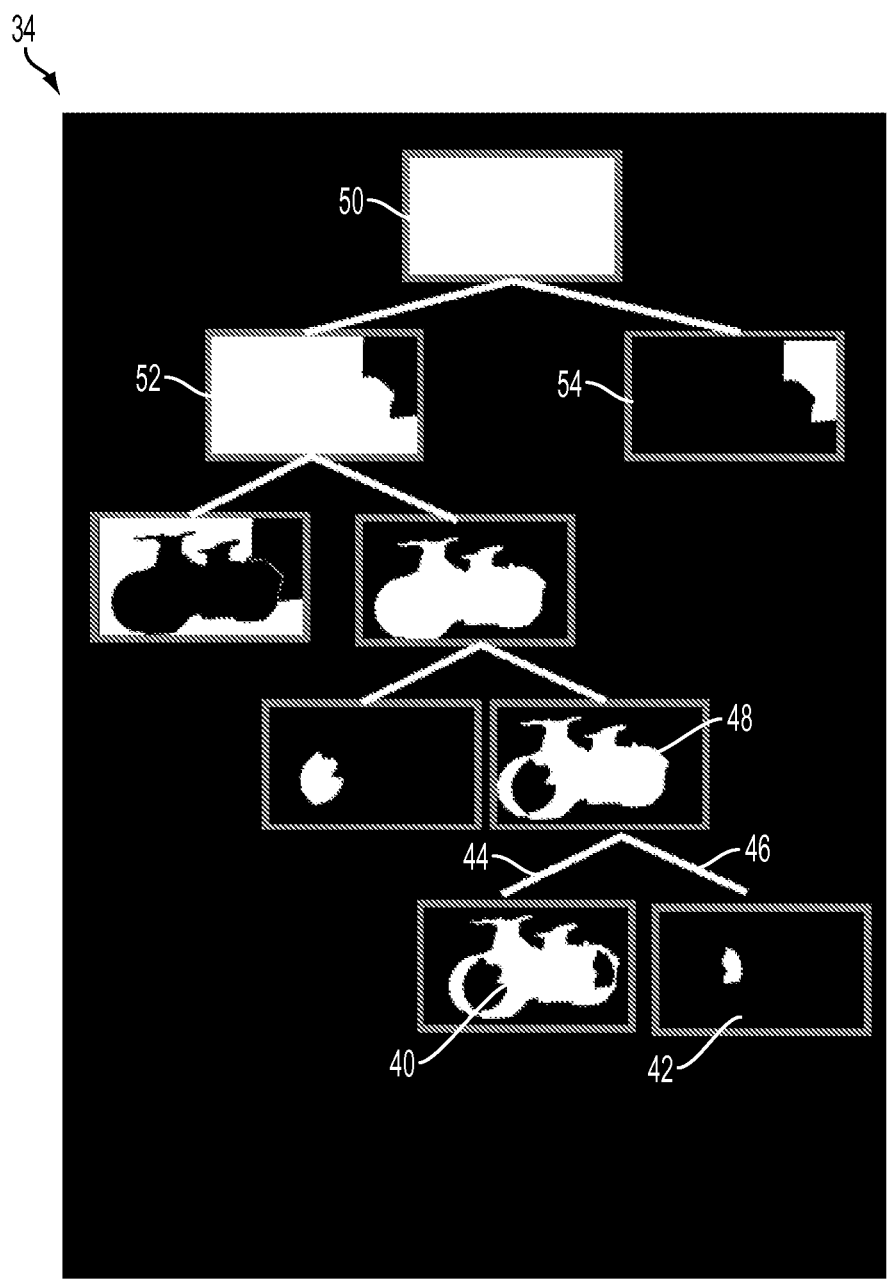
FIG. 3 illustrates the exemplary segmentation into a hierarchy of regions in greater detail.

The system 12 includes instructions 22 stored in main memory 24 for performing the exemplary method, which are implemented by a processor 26 in communication with the memory 24. The instructions 22 include a region detector 30 and a hierarchy generator 32 (which may be separate or combined) that together serve to generate a description of the image in the form of a hierarchy of regions 34, graphically illustrated in FIGS. 2 and 3. The hierarchy of regions 34 may be stored in data memory 36 of the system 12 during processing. The region detector 30 identifies regions of the image in an unsupervised manner by grouping together contiguous pixels. The hierarchy generator 32 arranges all of the identified regions into a hierarchy of regions 34 in which each parent region in the hierarchy is the sum (union) of its children. By this, it means that the parent region includes all of the pixels in all of its children. Additionally, each of the child regions has fewer pixels than its parent region. The regions in the hierarchy 34 may be referred to herein as hierarchy regions to distinguish them from the semantic regions 16, 17, 18, in the final labeled image.

Figure 4:
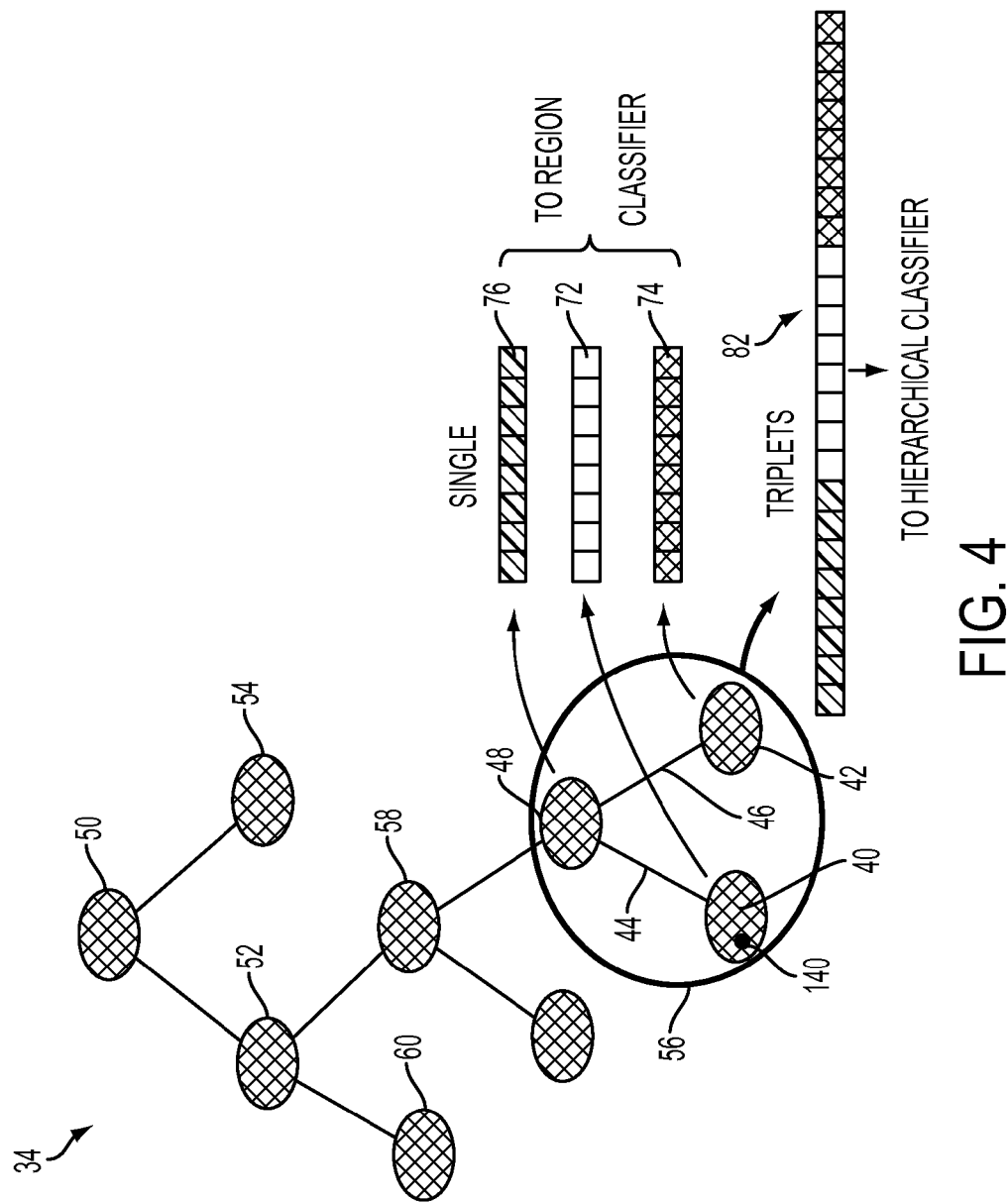
FIG. 4 graphically illustrates generating feature vectors for a hierarchy of regions in the exemplary method.

The illustrated hierarchy of regions 34 is in the form of a binary tree in which each pair of child regions (e.g., hierarchy regions 40 and 42), is linked by two edges 44, 46 to a respective parent region 48, which is the union of its two child regions 40, 42, i.e., includes the pixels of both regions 40, 42. FIG. 4 graphically illustrates the hierarchy of regions 34 for the example image 10 as a set of nodes connected by edges to form a tree where the root node 50 of the tree represents the entire image (all its pixels) and has exactly two child nodes 52, 54 (each corresponding to a respective hierarchy region of the image 10 which together form the entire image). Each of these child nodes 52, 54 can in turn serve as a parent node and, in the illustrated embodiment can have exactly 0 or 2 child nodes. Each child node has exactly one parent node, the parent node being the root node 50 or a node which is intermediate the root node and the child node. Leaf nodes, such as nodes 40 and 42 of the tree, have no child nodes and are all connected to the root node 50 by one or more edges. Each pixel of the image is in exactly one of the leaf nodes of the hierarchy.

In the exemplary embodiment, the number of parent and child nodes forming the tree 34 is not limited but there may be a stopping criterion in the segmentation algorithm or constraints placed on the size of the hierarchy regions such that no region in the hierarchy is below a threshold minimum size. The threshold minimum size may be expressed, for example, in terms of a number of pixels or an area. For example, each region in the hierarchy includes a plurality of pixels, such as at least 10 or at least 30 pixels, or at least 0.1% of the pixels/area of the image. Additionally, there may be a maximum threshold size for a hierarchy region forming a leaf of the tree (such as nodes 40, 42), such that regions above the maximum threshold size are required to have child nodes. For example, each leaf region in the hierarchy includes no more than 30% or no more than 20% of the pixels/area of the image. While a binary tree is illustrated, tertiary and higher level trees are also contemplated (where each parent node may have more than two child nodes).

A parent node and its respective (two) child nodes (siblings) are collectively referred to herein as a hierarchical structure, which in the case of a binary tree is a triplet, as exemplified by triplet 56 which includes child nodes 40, 42 and parent node 48. In the case of a binary tree, each hierarchical structure thus consists of exactly three nodes, each node corresponding to a region of the image, i.e., a group of contiguous pixels. As will be appreciated, each node in the hierarchy 34 is in exactly one or two triplets. For example node 48 is in a first triplet with its parent 58 and its sibling 60 and in a second triplet with its two children 40, 42. Node 60, is a leaf node (i.e., a node having no children), and is thus in only one triplet. The root node 50, having no parent node, is in exactly one triplet.

While images may vary in their tree structure 34, in general for a given image 10, there may be at least 10, or at least 20, or at least 30 and up to 1000 or 3000 or more regions generated which are arranged in the hierarchy 34; at least 5, or at least 10, or at least 20 and up to 1000 or more triplets 56 in the hierarchy; and at least 2, at least 5, or at least 10 (or at least 30% or at least 40%) of the regions in the hierarchy may be in two triplets, i.e., the tree structure of the hierarchy is highly branched and has several layers in the tree. For example, for at least 20%, or at least 30%, or at least 40% of the leaf nodes, such as nodes 40, 42, 60, there may be at least two or at least three intervening nodes between the leaf node and the root node 50.

While in the exemplary embodiment, the hierarchical structures 56 each consist of only two generations, i.e., a parent and children, in other embodiments, the hierarchical structures may consist of more than two generations, such as three generations, e.g., grandparent, parent, parent's sibling, and two pairs of children.

As the region detector 30 and hierarchy generator 32, any suitable unsupervised segmentation algorithm can be used that partitions the image into regions based on features of the pixels and builds a hierarchy of regions for each image can be used. The unsupervised segmentation works without the benefit of a semantic classifier, i.e., it does not use a classifier trained on any of the semantic labels, but rather looks for features such as boundaries, or brightness or color similarity within a region. For example, the Berkeley segmentation algorithm (see, Pablo Arbelaez, et al., "Contour detection and hierarchical image segmentation," IEEE Transactions on Pattern Analysis and Machine Intelligence (TPAMI) 33(5) pp. 898-916, November 2011, hereinafter, "Arbelaez, et al.") can be used which automatically generates the hierarchy of regions. This method makes use of a prior study of human habits regarding segmentation in determining how to segment an image. Alternatively, a super-pixel method can be used, such as Mean-Shift or a graph technique, such as Normalized cut (N-cut), to partition the image into regions that are transformed into a hierarchy of regions by agglomerative clustering using a similarity function between regions and an iterative merging procedure (see, D. Comaniciu and P. Meer, "Mean shift: A robust approach toward feature space analysis," IEEE TPAMI, 24(5):603-619 (2002); Jianbo Shi and Jitendra Malik, "Normalized cuts and image segmentation," TPAMI 22:888-905 (1997)). In the case where the resulting hierarchy 34 is not purely binary, additional parent nodes may be introduced by the hierarchy generator 32. For example, if a parent node has three child nodes, a new parent node may be interposed between the parent node and two of the child nodes.

With continued reference to FIGS. 1 and 4, the system 12 includes a region feature vector extractor 70 which generates a representation for each individual region 40, 42, 50, 52, 54, 58, 60, etc. in the hierarchy 34 in the form of a feature vector. Each region is thus assigned a respective region feature vector which encodes the region and which is based solely on the image data for that region, i.e., is not based on image data for any of the other regions of the image. FIG. 4 illustrates feature vectors 72, 74, 76, for a parent node 48 and its two child nodes 40, 42, respectively. The exemplary feature vectors 72, 74, 76 are statistical representations of the pixels forming the respective region. Examples of such representations include Fisher vectors, shape descriptors, and SIFT descriptors, as described below, although the method is not limited to any particular type of region representation. In the exemplary embodiment, the region feature vectors 72, 74, 76 are all of a same fixed length, e.g., of at least 20 or at least 30 vector elements.

The system 12 also includes a hierarchical feature vector generator 80 which generates a hierarchal representation 82 for each hierarchical structure 56 in the hierarchy 34. The hierarchical representation 82 is based solely on the image data for the (three) regions forming the respective triplet 56. The exemplary hierarchical representation 82 is a fixed length feature vector formed by aggregating only the region feature vectors 72, 74, 76 of the regions constituting the respective triplet 56, and thus is based on fewer than all the feature vectors for the image 10. The exemplary hierarchical feature vectors thus encode information from only two generations in the tree. In the exemplary embodiment, each triplet representation 82 is a concatenation of the respective region feature vectors 72, 74, 76 only the three regions forming the triplet and thus has three times the number of vector elements as each of the region feature vectors. In other embodiments, the region feature vectors may be weighted or otherwise aggregated (e.g., averaged), leading to fewer or more than three times the number of vector elements in the region vectors.

Having fixed length hierarchical feature vectors 82 is useful in training. These may also be obtained for other hierarchical structures in the case of non-binary trees, with a more complex combination mechanism. At test time, variable length hierarchical feature vectors could be employed.

While FIG. 4 shows only one feature vector 72, 74, 76 per region 40, 42, 48, it is to be appreciated that there may be more than one feature vector per region, for example, when different types of features are extracted, such as color and gradient features. The two or more feature vectors for each region may be aggregated (e.g., concatenated) to form the feature vectors 72, 74, 76, or may be used separately, with different classifiers, and the classifier results subsequently combined.

The system 12 may include a region classifier component 90 which includes a set of region classifier models, one region classifier model for each of a predefined set of two or more classes, each class corresponding to a respective possible label from the predefined set of labels. The region classifier models are trained, by a training component 92, using a supervised learning method, as described in greater detail below. In the training, the region classifier component 90 is input with respective region feature vectors for regions of manually labeled training images 94. The region feature vectors used in training are generated in the same way as region feature vectors 72, 74, 76, i.e., one region feature vector per region and optionally also per feature type. At test time, the trained region classifier models are input with the region feature vector 72, 74, 76 for each region and output probabilities or other scores for the respective region with respect to each class. The region classifier component 90 is optional and is omitted in some embodiments.

The system 12 includes a hierarchical classifier component 96 which includes a set of hierarchical (triplet) classifier models, one triplet classifier model for each of the predefined set of classes, each class corresponding to a respective possible label. The hierarchical classifier models are trained by the training component 92 using a supervised learning method. In the training, the hierarchical classifier component is input with respective hierarchical feature vectors and corresponding labels for the manually labeled training images 94, as described in greater detail below. These hierarchical feature vectors are generated in the same manner as for the triplet feature vectors 82 of the input image. At test time, the trained triplet classifier models are employed, by the hierarchical classifier component 96, to classify the triplet feature vector 82 for each triplet, and to output a probability or other score for the triplet with respect to each class. These triplet probabilities/scores can then be propagated to the pixels constituting the respective regions, with each region's label being influenced by the probability (or score) of the triplets in which it participates.

A labeling component 98 generates pixel maps 100, 102, 104 (FIG. 2) for the image, e.g., one per class, or one for each of a subset of the classes, based on the outputs of the hierarchical classifier component 96 and optionally also the region classifier component 90. The pixel maps are used to generate the segmentation map 14 for the image 10, in which semantic regions 16, 17, 18 of the image, which may not each correspond exactly to any one of the hierarchy regions or to a group thereof, are assigned a respective label 19, 20, 21. Regions not identified as being in one of the predefined semantic classes may be labeled as being in an "other" class.

The system 12 illustrated in FIG. 1 includes one or more input/output devices for communicating with external devices. For example, an input device 110 is configured for receiving the images 10, 94. An output device 112 outputs the segmentation map 14 for the image. The system 12 may be hosted by one or more computing devices 114 and may be linked via suitable wired or wireless links 116, 118, to an output device such as a display 120, for displaying the segmented image, and to a user input device 122, such as a keyboard, keypad, touchscreen, cursor control device, or the like, for inputting user commands to the processor 26. Hardware components 24, 26, 36, 110, 112 of the system may be communicatively connected by a data/control bus 124.

While components 30, 32, 70, 80, 90, 96, 98, 92 are illustrated as software components implemented by a processor 26 and hosted by a single computing device 114, it is to be appreciated that they may be separate or combined and may be hosted by different computing devices and/or memory storage devices accessible to one or more processors and/or implemented as hardware.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The computing device 114 can be, for example, a PC, such as a desktop, a laptop, palmtop computer, portable digital assistant (PDA), a server computer, cellular telephone, tablet computer, pager, combination thereof, or other computing device(s) capable of executing instructions for performing the exemplary method. The memory 24, 36 may represent any type of non-transitory computer readable medium such as random access memory (RAM), read only memory (ROM), magnetic disk or tape, optical disk, flash memory, or holographic memory. In one embodiment, the memory 24, 36 comprises a combination of random access memory and read only memory. In some embodiments, the processor 26 and memory 24 and/or 36 may be combined in a single chip. The interface devices 110, 112 allow the computer 114 to communicate with other devices directly or via a computer network, such as a local area network (LAN) or wide area network (WAN), or the internet, and may each comprise a modulator/demodulator (MODEM), USB port, disk drive or the like.

The digital processor 26 can be variously embodied, such as by a single-core processor, a dual-core processor (or more generally by a multiple-core processor), a digital processor and cooperating math coprocessor, a digital controller, or the like. The digital processor 26, in addition to controlling the operation of the computer 114, executes instructions stored in memory 24 for performing the method outlined in FIG. 5.

The training and test images 94, 10 may be input to the system 12 in any convenient file format, such as JPEG, GIF, JBIG, BMP, TIFF, or the like, or other common file format used for images, and which may optionally be converted to another suitable format prior to processing. Input images may be stored in data memory 36 during processing. The image 10 to be segmented can be input from any suitable image source, such as a workstation, database, memory storage device, such as a disk, or the like. The images 10, 94 may be individual images, such as photographs, scanned images, video images, or combined images which include photographs along with text, and/or graphics, or the like. In general, each input digital image includes image data for an array of pixels forming the image. The image data may include colorant values, such as grayscale values, for each of a set of color separations, such as L*a*b* or RGB, or be expressed in another other color space in which different colors can be represented. In general, "grayscale" refers to the optical density value of any single color channel, however expressed (L*a*b*, RGB, YCbCr, etc.). The word "color" is used to refer to any aspect of color which may be specified, including, but not limited to, absolute color values, such as hue, chroma, and lightness, and relative color values, such as differences in hue, chroma, and lightness. Monochrome images as well as full color images may be processed by the system.

Each of the training images 94 includes one or more semantic regions smaller in size than the entire image, each semantic region being labeled with a respective class label selected from the predetermined set of class labels. The labels may have been manually assigned to the semantic regions or otherwise derived from inputs by one or more human reviewers. The labels may be in the form of a tag, such as an XML tag, or stored in a separate file. Each label corresponds to a respective class from the finite set of classes. There may be as few as two classes, or a large number of classes such as at least 20, or at least 50, or at least 100, or at least 1000 classes, and up to 10,000 or more classes, depending on the application and the availability of training data. The same number or a subset of the classes may be used in the segmentation (labeling) stage. Optionally, one of the classes may be an "other" class which is used for all areas of the image that are not in one of the semantic classes of interest. The label of each region is applied to all the pixels in that region.

Figure 5:
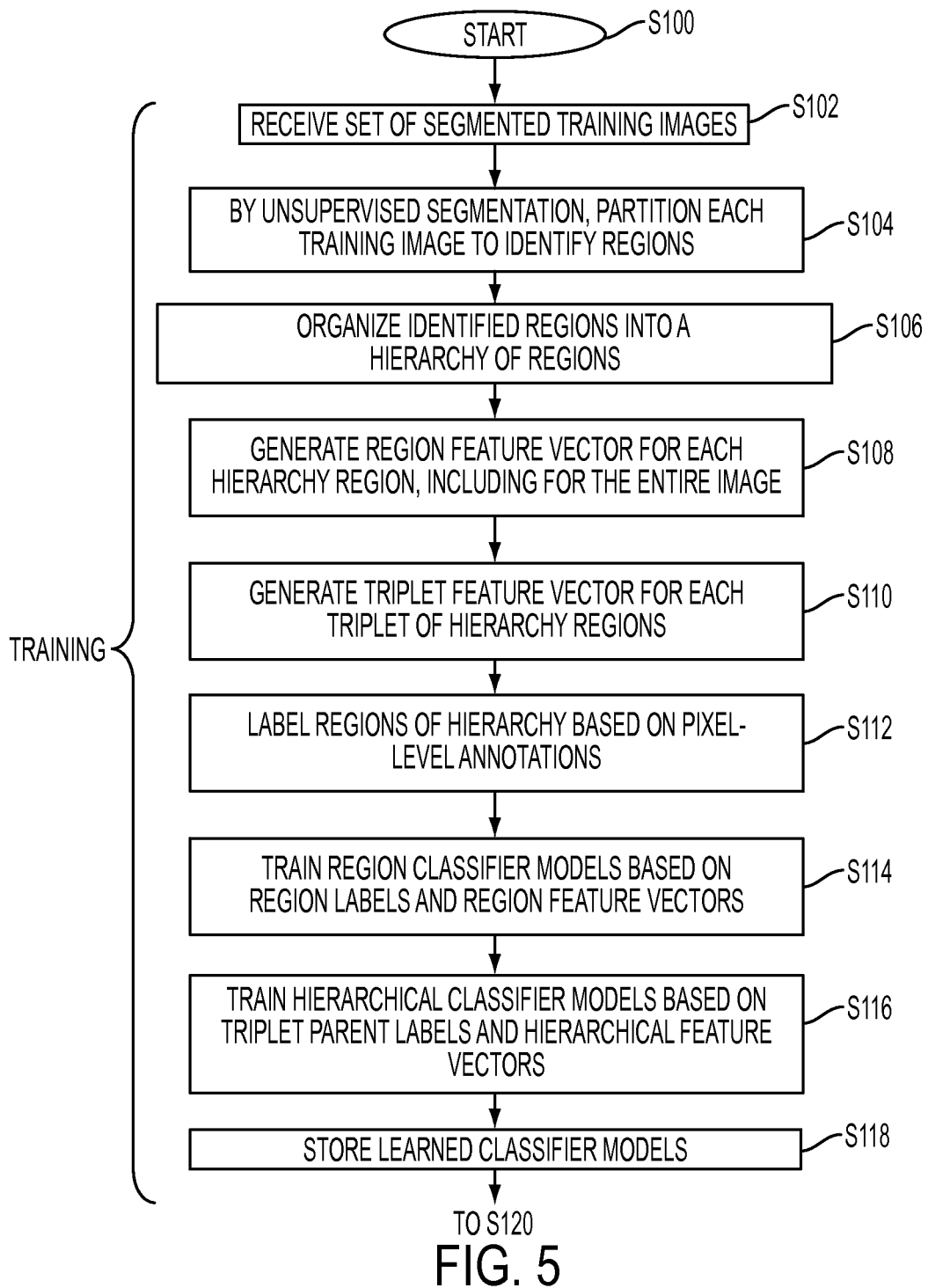
FIG. 5 is a flow chart illustrating an image segmentation method in accordance with one aspect of the exemplary embodiment.
Figure 5:
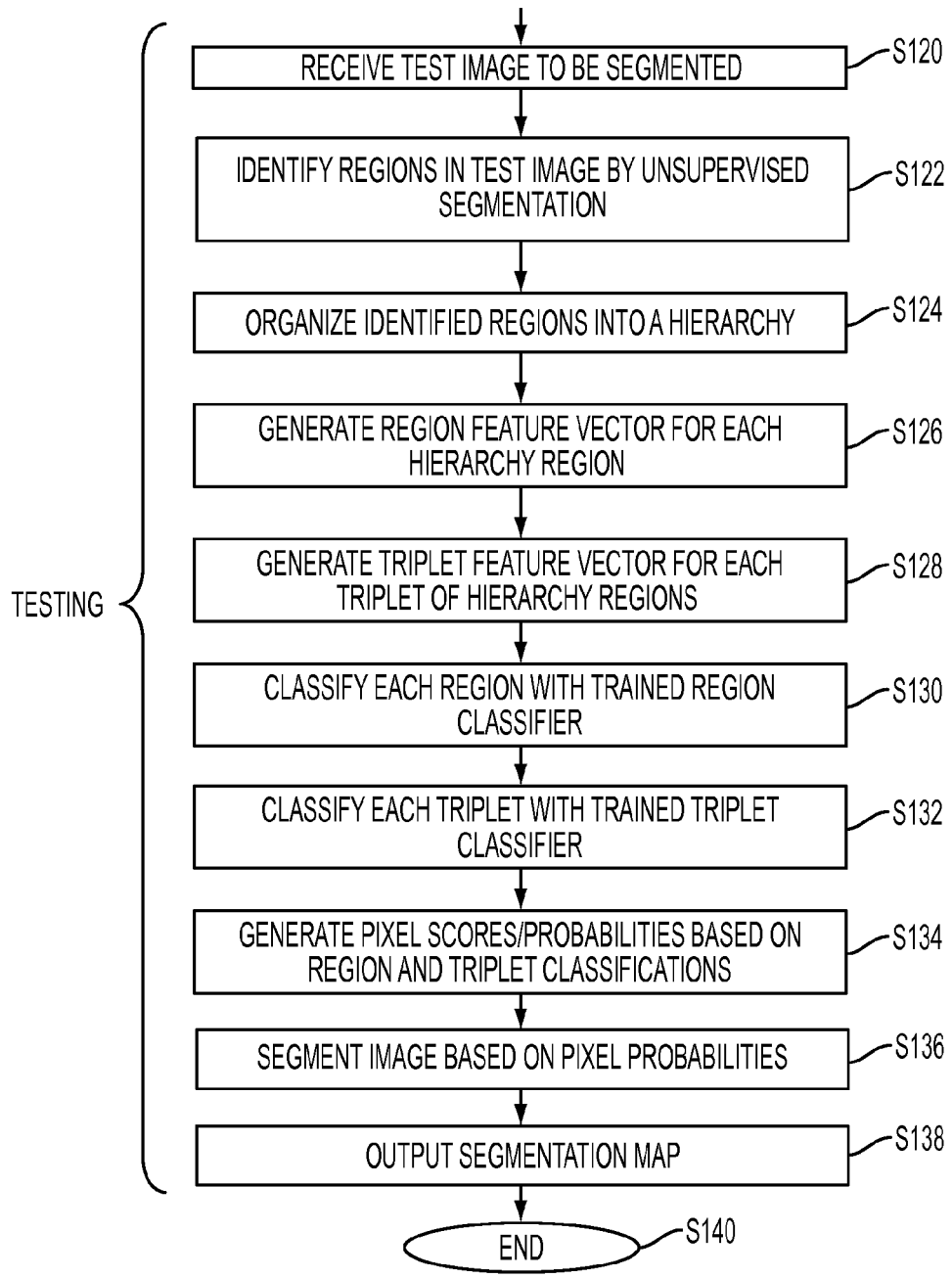

FIG. 5 illustrates the exemplary segmentation method, which includes a training phase and a segmentation (testing) phase. As will be appreciated, the two phases may be performed by the same computing device, as illustrated in FIG. 1, or by separate computing devices. The method begins at S100.

The training phase may proceed as follows. At S102, a set of training images 94 is received. For example at least 50, or at least 100, or more training images may be provided. The training images may each be provided with pixel level annotations according to class, with each pixel labeled with a maximum of one class. For example, to create the manually labeled training images, a human subject may view a training image on the screen, draw a border around an area of pixels (or otherwise identify a set of pixels along the border, such as corners of a box, or the like) corresponding to an object or part of an object which the subject considers is in one of the classes and select one of the predefined classes to assign to all the pixels within the border. The person repeats the process for any other objects corresponding to one of the classes. The system 12, or a different preprocessing system, may refine the person's defined areas slightly by identifying edges, sharp color changes and the like, and thereby mapping each region more closely to what the person likely would have intended if he or she had been more careful in defining the border. Any remaining areas that have not been manually labeled may be automatically labeled as being in an "other" class. The resulting semantic segmentation map of the training image, in which each pixel is assigned a single class label, may also be the product of the annotations of two or more human subjects.

At S104 regions are identified in the training images 94 by unsupervised segmentation (using region detector 30), i.e., without regard to the semantic class labels of the training images. For example, each training image may be recursively or otherwise partitioned into from about 30 to about 1000 of these regions, e.g., based on one or more of brightness, color, and texture consistency. All three are used in the exemplary unsupervised segmentation. At S106, the segmented regions are organized into a hierarchy 34 (using hierarchy generator 32). Steps S104 and S106 may be combined in some embodiments. For example, an unsupervised segmentation algorithm 30, 32 is applied to each training image that builds a hierarchy 34 of regions for each training image, for example by transforming (if needed) an output hierarchy into a binary tree. In the exemplary embodiment, the Berkeley segmentation algorithm is used which automatically generates the hierarchy. In the case of another super-pixel method like Mean-Shift or N-cut the identified regions (S104) are transformed into a hierarchy of regions (S106) by agglomerative clustering using a similarity function between regions. If the unsupervised segmentation method produces a hierarchical structure where a parent can have more than two children (as is the case in Arbelaez, et al., referred to above, the hierarchy of regions can be transformed into a binary tree. This is performed by splitting, into multiple layers, a layer where the parent region has more than two children, by iteratively merging two of the child nodes into a new parent, giving an extra layer to the tree.

At S108, for each training image 94, each hierarchy region is described by a representation of the region or "descriptor", in the form of a feature vector. The extraction of each region's feature vector, based on features of the respective region may be performed by the region feature vector extractor 70. As discussed above for region feature vectors 72, 74, 76, the region feature vectors for the training images 94 can be any conventional representation of the type used for representing regions, based on the pixels, and can be a statistical representation of features of the pixels in the region. In some embodiments, a combination of feature types is employed. The region feature vector may describe the appearance of the region and/or the shape of the region, or any other property of that region. For example, the region appearance may be based on one or more of the texture (e.g., SIFT features) or color of groups of pixels. The region shape may be described with one or more of gradient field (GF) and Global Probability of Boundary (GPB) features. These feature types may be combined into a single feature vector by early fusion or separate feature vectors for each feature type may be generated and input to separate classifier models and their outputs combined by late fusion.

At S110, for each training image 94, each parent node in the hierarchy of regions is described by a triplet feature vector, which can be extracted as described for the triplet feature vectors 82 of the image and performed by the hierarchical feature vector extractor 80. Each parent node is thus described by concatenating its own region feature vector with the region feature vectors of its two children.

At S112, for each training image 94, each hierarchy region and each triplet is labeled using the pixel-level annotations of the pixels in the respective region. Each region/triplet can be given a single label, which can be that of the most probable class, based on the semantic region where the majority of the pixels, or the greatest number of the pixels, lie. For example, if 70% of the pixels in a hierarchy region are labeled with class A and 30% with class B, the label for the hierarchy region can be A, which is the most probable. If there is no class having more than a threshold percentage of the pixels, such as 40% or 50%, the pixels, the class assigned may be "other," or no class. Thus, for example, the label for region 48 is a function of the pixel labels for the pixels in region 48 (which encompasses regions 40 and 42). For triplet 56, the same label as for region 48 can be used. In other embodiments the label for a hierarchy region or triplet can be a probabilistic assignment over two or more labels.

At S114, a region classifier model is optionally trained, by the training component 92, for each class (or a multiclass classifier model trained for all classes), on the region feature vectors and the respective labels of the hierarchical regions assigned at S112. For example, for each class, a set of positive samples (feature vectors for regions of training images labeled with that class) and negative samples (feature vectors for regions of training images that are not labeled with that class) is used to learn a classifier model, to be used by the region classifier component 90 in labeling hierarchy regions of unlabeled images 10. The training samples (region feature vectors and respective labels) can be considered as a bag-of-regions which are used by the classifier without location information. Where a region classifier is not used in the testing phase, this step can be omitted.

At S116, a hierarchical classifier model is trained, by the training component 92, for each class (or a multiclass classifier model trained for all classes) on the triplet feature vectors of the training images and the triplet labels (label of the parent in the triplet). For example, for each class, a set of positive samples (feature vectors for triplets labeled with that class) and negative samples (feature vectors for triplets not labeled with that class) is used to learn a classifier model, to be used by the hierarchical classifier component 96 in labeling triplets of unlabeled images 10. The training samples (hierarchical feature vectors and respective label of the parent region in the triplet) can be considered as a bag-of-triplets which are used by the classifier without location information.

At S118, the classifier models learned at S114 and S116 are stored in memory, such as memory 24 or 36. This completes the training phase.

At test time, a new (test) image 10 to be semantically segmented is received into memory 36 (S120).

At S122, S124, the same unsupervised segmentation algorithm 30, 32 is applied to the test image 10 as was applied at S104, S106. Specifically, at S122, regions 40, 42, 48, 52, 54, 58, 60 are identified in the test image 10 by unsupervised segmentation. For example, the test image may be segmented into from about 30 to about 1000 regions, e.g., based on color. At S122, a hierarchy 34 of the regions 40, 42, 48, 50, 52, 54, 58, 60 is generated by clustering similar regions into a binary tree. Each region 40, 42, 48, 50, 52, 54, 58, 60 is assigned to one or two triplets 56 in the tree.

At S126, each region is described by a region feature vector 72, 74, 76 (same type(s) of descriptor as for training at S108).

At S128, each triplet 56 is described by a hierarchical feature vector (same type(s) of descriptor as for training at S110).

At S130, each hierarchy region 40, 42, 48, 50, 52, 54, 58, 60 of the image 10 is classified based on the respective region feature vector 72, 74, 76, with the region classifier component 90, using the region classifier models trained at S114. For each region, a single, most probable class may be assigned, or a probability/score may be assigned for each class of at least some or all classes. In some embodiments, if there is no class of interest with at least a predefined threshold probability, the "other" class may be assigned to the region.

At S132, each triplet 56 of the image 10 is classified with the hierarchical classifier component 96, based on the respective triplet feature vector 82, using the hierarchical classifier models trained at S116. For each triplet, a single, most probable class label may be assigned, or a probability/score for each class may be assigned for at least some or all classes. In some embodiments, if there is no class of interest with at least a predefined threshold probability, the "other" class may be assigned to the triplet.

At S134 a score or a probability at the pixel level is provided for each class, using the classification outputs (e.g., scores) for all regions, triplets, and triplet parents that contain a given pixel, to compute the probability for that pixel. In the case of classifier models based on support vector machines (SVMs), for example, a sigmoid function can be used to convert the classifier SVM outputs into probabilities. However, any method for obtaining a probability from scores could be used in practice. Alternatively, a post-processing method can be employed which uses the SVM outputs directly. Then, the probabilities are aggregated, e.g., averaged, over all regions and triplets containing a pixel to obtain the probability for that pixel.

Thus, for example, a pixel 140 which is in leaf region 40 is given a probability for a given class, which is an aggregate, e.g., average (such as the mean) or other mixture model, of the class probabilities for leaf region 40, for its triplet 56, for each of the three triplets above it in the tree, as well as for the regions 48, 58, 52, and 50 that contain it, i.e., nine contributions in its mixture model. More generally, a pixel receives 2N−1 contributions, where N represents the level of the leaf node in the tree in which the pixel resides. The level corresponds to the number of generations, with the root counting as the first. For a pixel in a leaf node which is closer to the root, the number of contributions in the mixture model is thus fewer (5 contributions in the case of leaf node 60). If a region classifier is not used, and thus only the triplet classifications are available, each pixel receives N−1 contributions in its mixture model. As will be appreciated, different methods may be employed for computing the pixel probabilities which take into account fewer levels in the tree, such as only the local triplet. Additionally, if a late fusion approach is used, there may be two, or more, contributions per triplet and per region. The contributions may be equally weighted or may have different weights, which may have been learned based on an evaluation of segmentation accuracy.

Pixel maps 100, 102, 104 (FIG. 2) can be generated for each class. Gray scale is used in FIG. 2 to represent intensities (probabilities) with white representing the most probable and black the least.

At S136, the image 10 is segmented by partitioning the image into regions 16, 17, 18, based on the pixel scores/probabilities for each class. For this step, any suitable post-processing method is used to produce a final pixel-level multi-class segmentation. This may be a simple max pooling approach or a more complex model, such as a conditional random field (CRF) model, or the like. In max pooling, the highest class probability in a block of pixels is used as the label for the pixels in that block. In CRF, the final probability of a given pixel is influenced by surrounding pixel probabilities. This method assumes that neighboring pixels are more likely to have the same label. In CRF, a graph or lattice is built in which the labels of surrounding pixels are propagated via edges of the graph. See, for example, Lafferty, J., McCallum, A., Pereira, F. "Conditional random fields: Probabilistic models for segmenting and labeling sequence data," Proc. 18th International Conf. on Machine Learning. Morgan Kaufmann. pp. 282-289 (2001), and U.S. Pat. No. 8,107,726 and U.S. Pub. Nos. 20100322525 and 20100281009, U.S. patent application Ser. No. 13/251,459, filed Oct. 3, 2011, entitled GRAPH-BASED SEGMENTATION INTEGRATING VISIBLE AND NIR INFORMATION, by Neda Salamati, et al., the disclosures of which are incorporated by reference herein in their entireties, for methods of applying CRFs and other pixel labeling schemes. The result is that each pixel in the image is given a single label and each semantic region of the image includes a contiguous group of pixels labeled with the same class.

At S138, the segmentation map is output. The method ends at S140.

The exemplary method thus takes advantage of an unsupervised segmentation structure in the form of a hierarchy of regions. The method enables context information to be introduced in the recognition process through triplets, thus providing benefits when compared to methods which do not use such hierarchy information. Considering region triplets also allows the method to remain efficient and scalable to larger training sets, unlike other hierarchical methods which tend to be more computationally expensive. In contrast to other hierarchical methods, the exemplary method uses the hierarchy only locally.

The exemplary method considers the image as a bag-of-triplets (BoT) that represent parent regions (any non-leaf region) in the tree that describes the hierarchy of regions using a descriptor that encodes the information about this region and its children in the tree. The method may combine these hierarchy triplets with flat features, e.g., in the form of single region descriptors.

The method illustrated in FIG. 5 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 5, can be used to implement the segmentation method.

As will be appreciated, the steps of the method need not all proceed in the order illustrated and fewer, more, or different steps may be performed.

Various methods are available for computing representations of the regions. In general, the region feature vector extractor 70 generates a statistical representation 72, 74, 76 of low level features extracted from the respective region. Exemplary methods for generating feature vectors are described, for example, in U.S. Pub. Nos. 20030021481; 2007005356; 20070258648; 20080069456; 20080240572; 20080317358; 20090144033; 20090208118; 20100040285; 20100082615; 20100092084; 20100098343; 20100226564; 20100191743; 20100189354; 20100318477; 20110026831; 20110040711; 20110052063; 20110072012; 20110091105;

20110137898; 20110184950; 20120045134; 20120054130; 20120076401, and 20120158739, the disclosures of all of which are incorporated herein by reference in their entireties. The methods described in these references generally describe generating a representation for an entire image but can be adapted to the generation of representations of regions by considering only the pixels which are within a region or in a patch which is substantially contained within the region.

For example, the feature vectors 72, 74, 76 can be any suitable statistical representation, such as a multidimensional vector generated based on features extracted from the region or from patches of the region. The features can be shape, texture, or color features, combinations thereof, or the like. A histogram may be computed for each feature type and the feature vector based thereon.

As feature vectors extracted from the regions, SIFT descriptors or other gradient-based feature descriptors, can be used. See, e.g., David Lowe, "Distinctive image features from scale-invariant keypoints," International Journal of Computer Vision (IJCV) vol. 60 pp. 91-110 (2004), hereinafter, "Lowe". Other suitable local descriptors which can be extracted include simple color features in which for each of a plurality of sub-regions, the mean and standard deviation are computed for the three channels (R, G and B). These are merely illustrative examples, and additional and/or other features can be used.

In some illustrative examples, a Fisher vector is computed for the region by modeling the extracted local descriptors of patches of the region using a mixture model to generate a corresponding region feature vector having vector elements that are indicative of parameters of mixture model components of the mixture model representing the extracted local patch descriptors. The exemplary mixture model is a Gaussian mixture model (GMM) comprising a set of Gaussian functions (Gaussians) to which weights are assigned in the parameter training. Each Gaussian is represented by its mean vector, and covariance matrix. It can be assumed that the covariance matrices are diagonal. See, e.g., Perronnin, et al., "Fisher kernels on visual vocabularies for image categorization" in CVPR (2007). Methods for computing Fisher vectors are more fully described in above-mentioned U.S. Pub Nos. 20090208118, 20120076401, 20120045134, and 20120158739, and in Florent Perronnin, Jorge Sanchez, and Thomas Mensink, "Improving the fisher kernel for large-scale image classification," in *Proc. 11th European Conference on Computer Vision* (ECCV): Part IV, pages 143-156 (2010), and in Jorge Sánchez and Florent Perronnin, "High-dimensional signature compression for large-scale image classification," in CVPR 2011, the disclosures of all of which are incorporated herein by reference in their entireties.

In other illustrative examples, a Bag-of-Visual-word (BOV) representation is used as the region representation. In this case, the region is described by a histogram of quantized local features. (See, for example, U.S. Pub. No. 20080069456, the disclosure of which is incorporated herein by reference in its entirety). More precisely, given an (unordered) set of the local descriptors, such as set of SIFT descriptors or color descriptors extracted from a training or test image, a BOV histogram is computed for the regions of the image. The SIFT and color image representations can be aggregated to form the region representation.

Other example region feature vectors include contour descriptors (gPb), as described in Chunhui Gu, et al., "Recognition using regions," CVPR, pp. 1030-1037 (2009) and Joseph J. Lim, et al., "Context by region ancestry," ICCV, pp. 1978-1985 (2009) and Gradient field (GF) descriptors, as described in Rui Hu, Mark Barnard, and John P. Collomosse, "Gradient field descriptor for sketch based retrieval and localization," ICIP, pp. 1025-1028 (2010), hereinafter, "Hu, et al.", and U.S. Pub. No. 20110150324, the disclosure of which is incorporated herein by reference in its entirety.

Without intending to limit the scope of the exemplary embodiment, the following Examples illustrate implementation of the system and method.

EXAMPLES

Results from an implementation of the method show that using the hierarchical structure of the unsupervised segmentation method in conjunction with a triplets classifier improves the segmentation results, as compared to a method that operates on the regions independently.

The hierarchy of regions was generated using the method of Arbelaez, et al. This method segments an image from the finest level (the leaf layer) to the coarsest level (the root node, which is the entire image), based on the local image brightness, color, and texture consistency. Each layer is a partition of the image. Combining all the regions of all the layers produces the regions considered.

Datasets

Experiments were run on two different datasets:

1. The Weizmann dataset: this dataset is composed of images all containing one or several horses. The goal is to segment these images into two regions: horse and background. The dataset was divided into 50 training images, and 278 test images. Images are described as a hierarchy of regions, and the regions are described either with a global SIFT descriptor, using the method of Lowe, for each the regions, or with the gradient field (GF) descriptor of Hu, et al., hence these features can be seen as shape descriptors. Triplets are described by concatenating region descriptors of the parent and the two children. A linear SVM classifier was used both for the region descriptors and for the triplet descriptors. This dataset is evaluated as a binary classification problem at the pixel level (i.e., is this pixel part of a horse or not?). Reported numbers are area under curve (AUC) values for the precision-recall curve of the pixel-level binary classification problem.

2. MSRC Dataset from Microsoft: This dataset is composed of images of different outdoor scenes. 21 classes are labeled (Building, Grass, Tree, Cow, Sheep, Sky, Airplane, Water, Face, Car, Bicycle, Flower, Sign, Bird, Book, Chair, Road, Cat, Dog, Body, Boat). Remaining pixels are considered to belong to a void ("other") region that is ignored. The standard split provided by Jamie Shotton, et al., "Textonboost for image understanding: Multi-class object recognition and segmentation by jointly modeling texture, layout, and context," IJCV 81(1) pp. 2-23 (2009), was used, together with the dataset, that produces 335 images for training, and 256 images for test. Regions are described either by Fisher Vectors (FV), as described in Florent Perronnin, et al., "Improving the Fisher kernel for large-scale image classification," ECCV, pp. 143-156 (2010), that accumulate local appearance based on color (local RGB statistics) or texture (SIFT on the RGB region), or by the contour descriptor (GPB) of Chunhui Gu, et al., "Recognition using regions," CVPR, pp. 1030-1037 (2009) and Joseph J. Lim, et al., "Context by region ancestry," ICCV, pp. 1978-1985 (2009), that can be seen more as a shape descriptor. Again, a linear SVM is considered to learn region based and triplet based classifiers, one for each class. The dataset is evaluated as a multi-class classification problem by computing the average of the 21 per-class pixel-level classification accuracy.

The following methods were evaluated:
1. BoR: (Bag-of-Regions) a baseline method in which the regions are considered independently in the classification stage.
2. BoT: (Bag-of-Triplets): In this method the triplet classifier component was used but not the region classifier component.
3. BoR & BoT combines the two classifiers, one for regions and one for triplets.

Results for the Weizmann and MSRC datasets are shown in Table 1.

TABLE 1

Results for Weizmann and MSRC datasets overall AUC results based on binary SIFT and GF

|   | Weizmann | | MSRC | | |
| --- | --- | --- | --- | --- | --- |
|   |   |   | average | average | average |
|   | overall AUC results for Binary Sift | overall AUC results for GF feature | per-class accuracy for GBP feature | per-class accuracy for appearance (color) | per-class accuracy for appearance (SIFT) |
| BoR | 83.01 | 88.48 | 34.77 | 61.32 | 64.8 |
| BoT | 85.27 | 87.82 | 31.81 | 54.44 | 54.88 |
| BoR & BoT | 85.08 | 88.73 | 42.70 | 62.95 | 65.3 |

For all examples considered an improvement over the baseline (BoR) was found using the BoR & BoT method. On the Weizmann dataset, the global binary SIFT descriptor (Table 1), improves by about 2%, while the GF descriptor, that performs much better on the baseline, improves only by 0.3%. The MSRC dataset is more challenging, and about 8% gain was obtained, using the GPB features. The gain is less significant for the appearance features. This may be because the FV accumulates local information and the features of the children bring less new information compared to the global shape descriptors. Nevertheless, even in this case, combining BoR and BoT yields about 1.5% and 0.5% improvement over the BoR for both color and SIFT, respectively.

In some cases, the BoT alone performs very well, and combining both classifiers (BoR & BoT) does not provide a significant improvement, as shown for the global binary SIFT experiment on the Weizmann dataset. In other cases, the BoT, used alone, does not perform as well as the BoR baseline. This may be because there are fewer parents than regions in the tree, and consequently less examples to train the classifier. A larger training set may be helpful in such cases. Even so, the combination of both classifiers improves over the BoR baseline in all examples.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:
1. An image segmentation method comprising:
  generating a hierarchy of regions by unsupervised segmentation of an input image;
  describing each region of the hierarchy with a respective region multi-dimensional feature vector that is representative of the hierarchy region;
  identifying triplet hierarchical structures in the hierarchy, each of the triplet hierarchical structures comprising a parent hierarchy region and its respective child hierarchy regions;
  describing each of the input image triplet hierarchical structures with a respective triplet multi-dimensional feature vector, the triplet multi-dimensional feature vector being generated by aggregating the region multi-dimensional feature vectors of the respective parent hierarchy region and child hierarchy regions of the respective triplet hierarchical structure;
  with a hierarchical classifier component, classifying each of the input image triplet hierarchical structures according to a set of predefined classes, the hierarchical classifier component having been trained with triplet multi-dimensional feature vectors of triplet hierarchical structures of training images and respective labels of the triplet hierarchical structures of the training images, the training images comprising semantic regions labeled according to the set of predefined classes, the labels of the triplet hierarchical structures of the training images each being a function of the labels of the semantic regions in which pixels of the respective triplet hierarchical structure lie; and
  segmenting the input image into a plurality of semantic regions based on the classification of the triplet hierarchical structures.

2. The method of claim 1, wherein at least one of the classifying and segmenting is performed with a processor.

3. The method of claim 1, wherein the generating of the hierarchy of regions comprises partitioning the input image to identify regions and organizing the identified regions into the hierarchy of regions.

4. The method of claim 1, further comprising:
  classifying each of the hierarchy regions using a region classifier that has been trained with region multi-dimensional feature vectors describing hierarchy regions of the training images, combinations of the training image hierarchy regions forming the triplet hierarchical structures of the training images; and
  wherein the segmenting of the input image into a plurality of semantic regions is also based on the classification of the hierarchy regions.

5. The method of claim 1, further comprising assigning pixel probabilities or scores for the predefined classes to pixels of the input image based on the classification of the input image triplet hierarchical structures, each region in the hierarchy of regions including a plurality of the pixels, and wherein the segmenting of the input image is based on the pixel probabilities or scores.

6. The method of claim 5, wherein each pixel score or probability for each semantic label is computed based on the classifications of all triplet hierarchical structures that contain the pixel.

7. The method of claim 6, wherein each pixel score or probability for each semantic label is also based on a classification of all hierarchy regions that contains the pixel.

8. The method of claim 1, wherein the hierarchy of regions is in the form of a binary tree in which each parent hierarchy region has exactly two child hierarchy regions and no hierarchy region has more than one parent hierarchy region.

9. The method of claim 1, wherein each of the identified triplet hierarchical structures in the hierarchy is a triplet of exactly three hierarchical regions and wherein the triplet multi-dimensional feature vector is generated by aggregating the region multi-dimensional feature vectors of only the respective parent hierarchy region and child hierarchy regions of the respective triplet hierarchical structure.

10. The method of claim 1, wherein each triplet feature vector is generated by concatenating the multi-dimensional feature vectors of only the respective parent hierarchy region and child hierarchy regions.

11. The method of claim 1, wherein the region feature vectors are based on features selected from region appearance features, region shape features, and combinations thereof.

12. The method of claim 1, wherein each parent hierarchy region is the union of its child hierarchy regions.

13. The method of claim 1, wherein the image comprises a photograph.

14. A computer program product comprising a non-transitory recording medium storing instructions, which when executed by a computer processor, perform the method of claim 1.

15. A system comprising memory storing instructions for performing the method of claim 1 and a processor in communication with the memory, for executing the instructions.

16. An image segmentation system comprising:
  memory which stores:
    a region detector which identifies regions of an input image by unsupervised segmentation of the image;
    a hierarchy generator which arranges the identified regions into a hierarchy of regions in the form of a tree structure comprising a plurality of triplet hierarchical structures, each triplet hierarchical structure comprising a parent region and two child regions, each parent region being the union of its two respective child regions;
    a region feature vector extractor which describes each of the identified regions with a respective region multi-dimensional feature vector;
    a triplet feature vector generator which describes each of the plurality of triplet hierarchical structures with a respective triplet multi-dimensional feature vector which aggregates the region multi-dimensional feature vectors of only the respective parent region and two child regions;
    optionally, a region classifier component which classifies each of the regions in the hierarchy according to a predefined set of classes, based on the respective multi-dimensional region feature vector;
    a hierarchical classifier component, which classifies each of the plurality of triplet hierarchical structures according to the predefined set of classes based on the respective triplet multi-dimensional feature vector; and
    a labeling component for segmenting the input image into a plurality of semantic regions based on the classification of the triplet hierarchical structures and optionally also the classification of the regions of the hierarchy; and
  a processor in communication with the memory for implementing the region detector, hierarchy generator, region feature vector extractor, triplet feature vector generator, hierarchical classifier component, and labeling component.

17. The system of claim 16, wherein the region classifier component is included in the system and wherein the labeling component segments the input image into the plurality of semantic regions based on the classification of the triplet hierarchical structures and also the classification of the regions of the hierarchy.

18. A method for generating an image segmentation system, comprising:
  receiving a set of training images in which semantic regions of each image have been identified and labeled with a sematic class selected from a predefined set of semantic classes;
  for each of the training images:
    segmenting the training image in an unsupervised manner into a hierarchy of regions, without regard to the labels;
    extracting a region feature vector for each of the regions in the hierarchy of regions; and
    generating a triplet feature vector for each of a plurality of triplet hierarchical structures in the hierarchy, each triplet hierarchical structure comprising a parent region which is the union of two respective child regions, each triplet feature vector being based on the region feature vectors of exactly three regions comprising the respective parent region and the two respective child regions;
  training a hierarchical classifier model for at least one of the sematic classes based on the semantic region labels of the semantic regions in which pixels of the triplet hierarchical structures lie and the respective triplet feature vectors of the triplet hierarchical structures;
  optionally, training a region classifier model for the at least one of the sematic classes based on the semantic region labels and the region feature vectors;
  whereby, when a new image to be segmented according to semantic class is received, a labeling component is able to label a semantic region of the image according to a class in the set of classes based on triplet feature vectors for triplet hierarchical structures each comprising a parent and its two child regions of a hierarchy that are generated by unsupervised segmentation of the input image.

19. The method of claim 18, wherein the method includes training of the region classifier model.

20. An image segmentation method comprising:
  receiving an image to be segmented;
  generating a hierarchy of regions of the input image by segmenting the image in an unsupervised manner, the hierarchy of regions being in the form of a binary tree comprising triplets, each triplet comprising a parent region and two child regions;
  describing each region in the hierarchy with a region feature vector that describes at least one of the region appearance and the region shape;
  describing each of the triplets with a feature vector that aggregates the feature vectors of only the three regions of the triplet;
  optionally, providing a region classifier component trained with region feature vectors of training images comprising regions labeled according to semantic class;

optionally, classifying regions of the hierarchy, based on the respective region feature vectors, with the region classifier to generate a class score or probability for each of at least one of the semantic classes for each of the regions;

providing a hierarchical classifier component trained with triplet feature vectors of labeled training images and their labels, the labels of the triplets of the training images being based on the labels of the semantic regions in which pixels of the respective triplet lie;

classifying triplets of the hierarchy, based on the respective triplet feature vectors, with the hierarchical classifier to generate a class score or probability for each of at least one of the semantic classes for each of the triplets;

associating pixels of the input image with a score or a probability for each semantic class that is computed using the scores or probabilities of the triplets, and optionally of the hierarchy regions, that contain that pixel;

segmenting the input image into semantic regions based on the pixel scores or probabilities for the semantic classes.

21. The method of claim 1, wherein each of the region feature vectors comprises a statistical representation of low level features extracted from the respective region.

* * * * *